(12) United States Patent
Flournoy et al.

(10) Patent No.: US 8,568,593 B1
(45) Date of Patent: Oct. 29, 2013

(54) ANOXIC SYSTEM SCREEN SCOUR

(75) Inventors: Wayne J. Flournoy, Chapel Hill, NC (US); Richard L. Pehrson, Efland, NC (US)

(73) Assignee: Entex Technologies, Inc., Chapel Hill, NC (US)

( * ) Notice: Subject to any disclaimer, the term of this patent is extended or adjusted under 35 U.S.C. 154(b) by 456 days.

(21) Appl. No.: 12/792,721

(22) Filed: Jun. 2, 2010

Related U.S. Application Data

(60) Provisional application No. 61/183,536, filed on Jun. 2, 2009.

(51) Int. Cl.
*C02F 3/06* (2006.01)
(52) U.S. Cl.
USPC .............................. 210/615; 210/618; 210/903
(58) Field of Classification Search
USPC ......... 210/605, 615, 616, 617, 620, 621, 623, 210/630, 150, 151, 220, 221.1, 221.2, 903, 210/618
See application file for complete search history.

(56) References Cited

U.S. PATENT DOCUMENTS

| | | | |
|---|---|---|---|
| 578,548 A | 3/1897 | Deruelle | |
| 3,266,787 A | 8/1966 | Eckert | |
| 3,617,541 A | 11/1971 | Pan | |
| 3,752,453 A | 8/1973 | Doyne | |
| 3,785,620 A | 1/1974 | Huber | |
| 3,842,804 A | 10/1974 | Christensen et al. | |
| 3,864,246 A | 2/1975 | Casey et al. | |
| 3,882,027 A | 5/1975 | Lunt | |
| 3,914,351 A | 10/1975 | McKeown et al. | |
| 3,947,532 A | 3/1976 | Skold et al. | |
| 3,954,615 A | 5/1976 | Shelef | |
| 3,957,931 A | 5/1976 | Ellis | |
| 3,966,608 A | 6/1976 | Mason et al. | |
| D243,531 S | 3/1977 | Strigle, Jr. | |
| 4,122,011 A | 10/1978 | Strigle, Jr. | |
| 4,169,050 A | 9/1979 | Serfling et al. | |
| 4,177,147 A | 12/1979 | Roberts | |
| 4,195,043 A | 3/1980 | Foote et al. | |
| 4,267,052 A | 5/1981 | Chang | |
| 4,279,753 A | 7/1981 | Nielson et al. | |
| 4,296,050 A | 10/1981 | Meier | |

(Continued)

FOREIGN PATENT DOCUMENTS

DE  3728812 A1  10/1988
EP  0346013 A1  12/1989

(Continued)

OTHER PUBLICATIONS

Flournoy et al., U.S. Appl. No. 29/363,301, filed Jun. 8, 2010. (Item 8 on Information disclosure statement filed Aug. 16, 2010).

(Continued)

*Primary Examiner* — Fred Prince
(74) *Attorney, Agent, or Firm* — MacCord Mason PLLC

(57) ABSTRACT

Wastewater systems, methods and/or kits configured such that one or more screens and one or more gases introduced into the system allow the one or more gases to at least partially contact the one or more screens to dislodge or discourage the media or solids from and/or the biology growth on the one or more screens without substantially affecting the oxygen level in the proximity of the one or more screens.

32 Claims, 6 Drawing Sheets

(56) References Cited

U.S. PATENT DOCUMENTS

| | | | |
|---|---|---|---|
| 4,303,600 A | 12/1981 | Roe, Jr. | |
| 4,333,893 A | 6/1982 | Clyde | |
| 4,422,930 A | 12/1983 | Hatanaka | |
| 4,425,231 A | 1/1984 | Fujimoto et al. | |
| 4,431,549 A | 2/1984 | Highstreet et al. | |
| 4,434,061 A | 2/1984 | McDowell | |
| 4,511,519 A | 4/1985 | Hsia | |
| 4,522,767 A | 6/1985 | Billet et al. | |
| 4,595,296 A | 6/1986 | Parks | |
| 4,599,174 A | 7/1986 | McDowell | |
| 4,600,544 A | 7/1986 | Mix | |
| 4,620,930 A | 11/1986 | McDowell | |
| 4,639,314 A | 1/1987 | Tyer | |
| 4,668,387 A | 5/1987 | Davie et al. | |
| 4,668,442 A | 5/1987 | Lang | |
| 4,743,382 A * | 5/1988 | Williamson et al. | 210/786 |
| 4,806,288 A | 2/1989 | Nowosinski et al. | |
| 4,818,404 A | 4/1989 | McDowell | |
| 4,898,672 A * | 2/1990 | Clifft et al. | 210/614 |
| 4,940,540 A | 7/1990 | McDowell | |
| D345,410 S | 3/1994 | Del Prete | |
| 5,298,164 A * | 3/1994 | Hapach et al. | 210/604 |
| D353,438 S | 12/1994 | Yuksel | |
| D354,544 S | 1/1995 | Erwes | |
| 5,458,779 A | 10/1995 | Odegaard | |
| 5,468,392 A | 11/1995 | Hanson et al. | |
| 5,498,376 A | 3/1996 | St. Louis et al. | |
| 5,543,039 A | 8/1996 | Odegaard | |
| 5,549,828 A | 8/1996 | Ehrlich | |
| 5,580,644 A | 12/1996 | Minami | |
| 5,585,266 A | 12/1996 | Plitt et al. | |
| 5,690,819 A | 11/1997 | Chianh | |
| 5,693,383 A | 12/1997 | Basse et al. | |
| 5,741,417 A * | 4/1998 | Patzig et al. | 210/202 |
| 5,771,716 A | 6/1998 | Schlussel | |
| 5,779,886 A | 7/1998 | Couture | |
| 5,839,828 A | 11/1998 | Glanville | |
| 5,863,128 A | 1/1999 | Mazzei | |
| 6,015,490 A * | 1/2000 | Katsukura et al. | 210/151 |
| 6,039,873 A | 3/2000 | Stahler | |
| 6,109,781 A | 8/2000 | Ogasawara et al. | |
| 6,126,829 A | 10/2000 | Gunnarsson et al. | |
| 6,170,216 B1 | 1/2001 | Rye et al. | |
| 6,173,526 B1 | 1/2001 | Mazzei | |
| 6,383,373 B1 | 5/2002 | Nakao et al. | |
| 6,444,126 B1 | 9/2002 | Gates et al. | |
| 6,464,211 B1 | 10/2002 | Downs | |
| D465,257 S | 11/2002 | Van Olst et al. | |
| 6,524,849 B1 | 2/2003 | Adams et al. | |
| 6,685,826 B1 | 2/2004 | James | |
| 6,726,838 B2 | 4/2004 | Schechter et al. | |
| 6,730,214 B2 | 5/2004 | Mazzei | |
| 6,852,227 B1 | 2/2005 | Petrone | |
| 6,858,144 B2 | 2/2005 | Narita et al. | |
| 6,899,359 B2 | 5/2005 | Presby | |
| 6,916,421 B1 | 7/2005 | Cullinan et al. | |
| 7,028,849 B2 * | 4/2006 | Froud | 210/408 |
| 7,189,323 B2 | 3/2007 | Lofqvist et al. | |
| 7,246,795 B2 | 7/2007 | Niknafs et al. | |
| 7,445,715 B2 | 11/2008 | Pehrson et al. | |
| 7,691,262 B2 | 4/2010 | Pehrson et al. | |
| D618,760 S | 6/2010 | Flournoy et al. | |
| 7,736,508 B2 * | 6/2010 | Limcaco | 210/602 |
| 2002/0113010 A1 * | 8/2002 | Ricketts | 210/615 |
| 2003/0127378 A1 | 7/2003 | Schechter et al. | |
| 2003/0192827 A1 | 10/2003 | McDowell et al. | |
| 2004/0011737 A1 | 1/2004 | McDowell et al. | |
| 2004/0151547 A1 | 8/2004 | Presby | |
| 2004/0178132 A1 | 9/2004 | Nakhla et al. | |
| 2004/0256315 A1 | 12/2004 | Boyd et al. | |
| 2005/0104376 A1 | 5/2005 | Presby | |
| 2007/0102354 A1 | 5/2007 | Flournoy et al. | |
| 2010/0163485 A1 | 7/2010 | Pehrson et al. | |

FOREIGN PATENT DOCUMENTS

| | | | |
|---|---|---|---|
| EP | 0695721 A2 | 2/1996 | |
| EP | 1340720 A1 | 9/2003 | |
| GB | 1498360 | 1/1978 | |
| JP | 58-219994 A | * 12/1983 | |
| JP | 6-238290 A | * 8/1994 | |
| JP | 2001-286880 A | * 10/2001 | |
| JP | 2009-247989 A | * 10/2009 | |
| WO | 8801197 | 2/1988 | |
| WO | 9111396 A1 | 8/1991 | |
| WO | 9603351 A1 | 2/1996 | |
| WO | 0198477 A1 | 12/2001 | |
| WO | 03051485 A1 | 6/2003 | |
| WO | 03068694 A1 | 8/2003 | |
| WO | 2006058097 A1 | 6/2006 | |

OTHER PUBLICATIONS

International Search Report dated May 22, 2007 in PCT/US2005/042503. (Item 11 on information disclosure statement filed Aug. 16, 2010).

Pehrson et al., U.S. Appl. No. 12/752,658, filed Apr. 1, 2010. (Item 16 on information disclosure statement filed Aug. 16, 2010).

Pehrson et al., U.S. Appl. No. 12/792,721, filed Jun. 2, 2010. (Item 17 on information disclosure statement filed Aug. 16, 2010).

USFilter, Integrated Headworks Systems, article, Copyright 2000, pp. 1-12, LB-HW-BR-1000, US Filter, Chalfont, PA. (Item 27 on information disclosure statemnt filed Aug. 16, 2010).

Johnson, T.; Wallis-Lage, C.; Shaw, A. R.; McQuarrie, J. "IFAS Options: Which One is Right for Your Project?," pp. 18-22, Water Environment & Technology Magazine (WE&T) Nov. 2005. (Item 29 on information disclosure statement filed Aug. 16, 2010).

Brentwood Industries, Integrated Fixed Film/Activated Sludge (IFAS) Technology, article, Copyright Oct. 2001, pp. 1-6, Document 4.0, Brentwood Industries, Reading, PA.

David Krichten and Curtis McDowell, Simultaneous Nitrification and Denitrification in Biofilms of an Engineered Integrated Fixed-Film Activated Sludge (IFAS) System, article, pp. 1-4, Brentwood Industries, Reading, PA.

Diffuser Express a Division of Environmental Dynamics Inc., Catalog #105-2006, catalog, Date Unknown, pp. 1-30, Diffuser Express, Columbia, MO.

Emanuel P. Psaltakis, James Liubicich, Paul Pitt, Paul Antonio and Sole Posada of Hazen and Sawyer, P.C., Demonstration of Integrated Fixed Film Activated Sludge Process for BNR at the Mamaroneck WWTP, article, Copyright 2003, pp. 1-22, Water Environment Federation Technical Exhibition and Conference (WEFTEC) 2003, Water Environment Federation, Alexandria, VA.

Entex Technologies, Inc., BioWeb fixed media system, article, Copyright 2004, pp. 1-2, Entex Technologies, Inc., Chapel Hill, NC.

Entex Technologies, Inc., Internet website: (http://www.entexinc.com/Installations.htm), pp. 1-2, Entex Technologies, Inc., Chapel Hill, NC.

Flournoy et al., U.S. Appl. No. 11/552,778 (now abandoned), filed Oct. 25, 2006, Office Action dated Apr. 9, 2008.

Flournoy et al., U.S. Appl. No. 29/363,301, filed Jun. 8, 2010.

Hydroxyl Systems Inc., Hydroxyl Systems Advanced Water and Wastewater Treatment, article, Copyright 2003, 66 pages, internet address http://hydroxyl.com/hydroxyl.html, Hydroxyl Systems Inc., Victoria, BC Canada.

Hydroxyl Systems Inc., The Hydroxyl—F3R Process innovative biological treatment technology, article, pp. 1-2, Hydroxyl Systems Inc., Sidney, BC Canada.

International Search Report mailed on Apr. 5, 2008 in PCT/US2005/042503.

International Search Report mailed on Feb. 23, 2007 in PCT/US2006/041818.

Pehrson et al., U.S. Appl. No. 11/284,792 (now U.S. Patent No. 7,445,715), filed Nov. 22, 2005, Office Action dated Jul. 11, 2007.

Pehrson et al., U.S. Appl. No. 11/284,792 (now U.S. Patent No. 7,445,715), filed Nov. 22, 2005, Office Action dated Feb. 13, 2008.

Pehrson et al., U.S. Appl. No. 12/250,053 (now U.S. Patent No. 7,691,262), filed Oct. 13, 2008, Office Action dated Apr. 2, 2009.

(56) References Cited

OTHER PUBLICATIONS

Pehrson et al., U.S. Appl. No. 12/752,658, filed Apr. 1, 2010.
Pehrson et al., U.S. Appl. No. 12/792,721, filed Jun. 2, 2010.
Pulsed Hydraulics, Inc., Variable "Speed" Tank Mixing With No In-basin Moving Parts, article, Copyright 2005, 8 pages; internet address http://phiwater.com/, Pulsed Hydraulics, Inc., Bellevue, WA.
Robert Zammataro, Andrew G. Lynn, P.E., DEE, Donald E. Maurer, P.E., DEE and Roderick D. Reardon, P.E., DEE, Upgrading a Contact Stabilization Treatment Plant to a Nitrifying Activated Sludge Process by Using Integrated Fixed-Film Activated Sludge (IFFAS) Media, paper, pp. 1-9, Date Unknown.
Sarah B. Hubbell and David J. Krichten of Brentwood Industries Inc., Demonstration and Full Scale Results of a Plant Upgrade for BNR Using Integrated Fixed-Film Activated Sludge (IFAS) Technology, article, Copyright 2004, pp. 1-8, Water Environment Federation Technical Exhibition and Conference (WEFTEC) 2004, New Orleans, Louisiana, Oct. 2-6, Water Environment Federation, Alexandria, VA.
Sarah B. Hubbell, Richard Pehrson and Andrew Schuler of Entex Technologies Inc., Eight Years of Successful Cold Weather Nitrification With Integrated Fixed-Film/Activated Sludge, paper, pp. 1-11, Proceedings of the Water Environment Federation Annual Conference (WEFTEC), Dallas, Texas, Oct. 22-25, 2006.
Sarah B. Hubbell, Richard Pehrson, and Wayne Flournoy, "Webitat Advanced IFAS System Addresses Common Fixed Media Concerns," Entex Technologies, Inc., date unknown.
Terry L. Johnson, Andrew Shaw, Heather Phillips, Nancy Choi, Thomas Lauro, Ralph Butler, and Leah Radko, A Pilot-Scale Comparison of IFAS and MBBR to Achieve Very Low Total Nitrogen Concentrations, article, copyright 2007, pp. 1-14, vol. 1, No. 5, Water Environment Federation, Alexandria, VA.
United States Environmental Protection Agency, Fine Pore (Fine Bubble) Aeration Systems, Summary Report, Oct. 1985, pp. 1-50, EPA/625/8-85/010, EPA Water Engineering Research Laboratory, Cincinnati, Ohio.
United States Environmental Protection Agency, Fine Pore Aeration Systems, Design Manual, Sep. 1989, pp. 1-305, EPA/625/1-89-023, EPA Center for Environmental Research Information, Cincinnati, Ohio.
United States Environmental Protection Agency, Jeremiah J. McCarthy, Technology Assessment of Fine Bubble Aerators, report, Feb. 1982, pp. 1-48, EPA/600/2-82/003, USEPA Municipal Environmental Research Laboratory, Cincinnati, Ohio.
USFilter, Integrated Headworks Systems, article, Copyright 2000, pp. 1-12, LB-HW-BR-1000, USFilter, Chalfont, PA.
Water Environment & Technology, David R. Jackson, Leonard E. Ripley, Tod Maurina and Sarah Hubbell, Up to the Challenge IFAS Helps Growing Texas City Meet Discharge Limits, Expand Capacity, magazine, Nov. 2007, pp. 51-55, Water Environment & Technology.
Water Environment & Technology, Terry L. Johnson, Cindy Wallis-Lage, Andrew R. Shaw and Jim McQuarrie, IFAS Options Which One is Right for Your Project?, magazine, Nov. 2005, pp. 18-22, Water Environment & Technology.
Written Opinion mailed on Apr. 5, 2008 in PCT/US2005/042503.
Written Opinion of the International Searching Authority mailed on Feb. 23, 2007 in PCT/US2006/041818.

\* cited by examiner

ANOXIC SYSTEM SCREEN SCOUR

This application claims the benefit of U.S. Provisional Application No. 61/183,536, filed Jun. 2, 2009, the disclosure of which is expressly incorporated herein by reference.

SUMMARY

The problem is that the screen(s) used in current wastewater systems may be blinded by media, other solids or the biology growth on the screen(s) and that current methods of dislodging or discouraging the media, solids or biology growth may affect the oxygen levels beyond the proximity of the screen(s) is addressed by configuring the screen(s) and gas(es) introduced into the system to allow the gas(es) to at least partially contact the screen(s) to dislodge or discourage the media or solids from and/or biology growth on the screen(s) without substantially affecting the oxygen level in the proximity of the screen(s). Aspects of embodiments and embodiments of the present invention address these and other problems by providing, without limitation, methods, systems and/or kits.

Accordingly, some aspects of embodiments and embodiments of the present invention provide a method of dislodging or discouraging media from and/or biology growth on one or more screens in a wastewater system (e.g., an anoxic treatment system) by at least partially contacting one or more screens with one or more gases in such a way that the oxygen levels of the wastewater system in proximity to the one or more screens are substantially maintained at the same oxygen levels as when the one or more gases are not provided for at least partially contacting the one or more screens (hereinafter referred to as "Embodiment $\alpha$").

Some other aspects of embodiments and embodiments of the present invention provide a wastewater system including one or more screens and one or more means for providing one or more gases (hereinafter referred to as "Embodiment $\beta$"). In aspects, the means for providing the one or more gases is configured in such a way that the one or more gases at least partially contact the one or more screens. In other aspects, the oxygen levels of the wastewater system in proximity to the one or more screens are substantially maintained at the same oxygen levels as the oxygen levels present when the one or more gases are not provided for at least partially contacting the one or more screens. In yet other aspects, the means for providing the one or more gases is configured in such a way that the one or more gases at least partially contact the one or more screens and the oxygen levels of the wastewater system in proximity to the one or more screens are substantially maintained at the same oxygen levels as the oxygen levels present when the one or more gases are not provided for at least partially contacting the one or more screens.

Still other aspects of embodiments and embodiments of the present invention provide a kit for adapting a wastewater system, where the kit may include one or more screens, one or more means for providing one or more gases, and one or more means for interrelating the one or more screens and the one or more means for providing one or more gases such that the one or more gases will at least partially contact the one or more screens (hereinafter referred to as "Embodiment $\gamma$"). In aspects, the oxygen levels of the wastewater system in proximity to the one or more screens are substantially maintained at the same oxygen levels as the oxygen levels present when the one or more gases are not provided for at least partially contacting the one or more screens. In other aspects, the oxygen levels are substantially maintained at the same level as the oxygen levels present prior to installation of the kit. In yet other aspects, the oxygen levels of the wastewater system in proximity to the one or more screens are substantially maintained at the same oxygen levels as the oxygen levels present when the one or more gases are not provided for at least partially contacting the one or more screens and the oxygen levels are substantially maintained at the same level as the oxygen levels present prior to installation of the kit.

In Embodiments $\alpha$, $\beta$, and $\gamma$, at least one of the one or more gases may be oxic. In aspects, the one or more gases comprise at least one gas including oxygen.

Embodiments $\alpha$, $\beta$, and $\gamma$ may further comprise one or more means for facilitating the movement of the one or more gases out of the wastewater system while substantially maintaining the oxygen levels of the wastewater system in proximity to the one or more screens at the same oxygen levels as when the one or more gases are not provided for at least partially contacting the one or more screens. In aspects, the one or more means for facilitating the movement of the one or more gases out of the wastewater system may comprise one or more gas conduits through which the one or more gases are provided to the system. In other aspects, the one or more screens may be configured in relation to the one or more gas conduits such that the longest axis of the one or more screens is in a substantially perpendicular orientation and the shortest axis of the one or more screens is in a substantially parallel orientation. In addition to or separate from the above aspects, the one or more means for facilitating the movement of the one or more gases out of the wastewater system may comprise one or more vents wherein the one or more vents may be configured so as to allow at least a portion of the one or more gases to exit the wastewater system in proximity to the one or more screens.

In Embodiments $\alpha$, $\beta$, and $\gamma$, the one or more gases may be provided in such a way as to allow the one or more gases to at least partially contact the one or more screens in such a way as to dislodge or discourage media or biology growth from adhering to the one or more screens.

In Embodiments $\alpha$, $\beta$, and $\gamma$, the wastewater system may be configured to maintain the denitrification process of the wastewater system in proximity to the one or more screens. In Embodiments $\alpha$, $\beta$, and $\gamma$, the wastewater system may be configured not to stop the denitrification process of the wastewater system in proximity to the one or more screens.

In aspects of Embodiments $\alpha$, $\beta$, and $\gamma$, "proximity" refers to that area of the wastewater system greater than the width x of the screen assembly screen. Those having skill in the art will appreciate that x may be about a foot or less. In other aspects, proximity may be as little as five inches or less. In still other aspects, proximity may be as little as three inches or less. In further aspects, proximity may be as little as one inch or less. Those having skill in the art will appreciate that the proximity will be such that the purpose of the invention is preserved.

In Embodiments $\beta$ and $\gamma$, the one or more screens and the one or more means for providing the one or more gases may be configured in such a way that at least a portion of the one or more gases pass through the one or more screens. In Embodiments $\beta$ and $\gamma$, the one or more screens may be arcuate. In Embodiments $\beta$ and $\gamma$, the one or more means for providing one or more gases may comprise one or more gas conduits.

In Embodiment $\alpha$, the one or more gases may be provided using a gas conduit.

In Embodiments $\alpha$, $\beta$, and $\gamma$, the wastewater system may include a basin. In aspects, the basin may include anoxic liquor, one or more inlets, one or more outlets, and one or more means for providing one or more gases to one or more screens (e.g., anoxic system screen scours). In other aspects, the one or more anoxic system screen scours may be located adjacent to the wall of the basin at the outlet. In further aspects, the anoxic system screen scour may include one or more screen assemblies. In other aspects, the anoxic system screen scour may further include one or more areas of solid material. In other aspects, the one or more screen assemblies may include one or more screens and one or more gas conduits. In aspects, the one or more gas conduits may be configured in such a way as to allow one or more gases to at least partially contact the one or more screens. In other aspects, the one or more gas conduits may be configured to allow the one or more gases to pass through the one or more screens and substantially through the outlet. In further aspects, the one or more gases may contact the one or more screens in such a way as to dislodge or discourage biology growth on the one or more screens; and wherein the anoxic character of the anoxic liquor is substantially maintained. In other aspects, the system may further include media. In further aspects, the one or more gases may contact the one or more screens in such a way as to dislodge or discourage media from the one or more screens; and wherein the anoxic character of the anoxic liquor is substantially maintained. In aspects, the outlet may be smaller than the screen assembly. In yet other aspects, the one or more screens may be sized to substantially prevent the media from exiting the system. In addition to or separately from the above other aspects, the one or more screens may be configured in such a way as to facilitate the at least partial contact of the one or more gases with the one or more screens. In other aspects, the one or more screens may be configured in relation to the gas conduit such that the longest axis of the screen is in a substantially perpendicular orientation and the shortest axis of the screen is in a substantially parallel orientation. In aspects, the bottom of the screen assembly may be narrower than the top of the screen assembly.

Numerous other aspects of embodiments, embodiments, features, and advantages of the present invention will appear from the above description and the accompanying drawings. In that description and/or the accompanying drawings, reference is made to exemplary aspects of embodiments and/or embodiments of the invention which can be applied individually or combined in any way with each other. Such aspects of embodiments and/or embodiments do not represent the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of the present invention will become apparent from the following detailed description, the accompanying drawings, and the appended claims.

BRIEF DESCRIPTION OF THE DRAWINGS

The drawings referenced herein form a part of the specification. Features shown in the drawings are meant to be illustrative of some, but not all, embodiments of the invention, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

DETAILED DESCRIPTION OF THE INVENTION

In the following detailed description of exemplary aspects of embodiments and embodiments of the invention, reference is made to the accompanying drawings that form a part hereof, and in which are shown by way of illustration specific aspects of embodiments and embodiments in which the invention may be practiced. While these aspects of embodiments and embodiments are described in sufficient detail to enable those skilled in the art to practice the invention, it will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and embodiments may be utilized, logical changes (e.g., without limitation, any one or more of chemical, compositional (e.g., without limitation, any one or more of chemicals, materials, . . . and the like), electrical, electrochemical, electromechanical, electro-optical, mechanical, optical, physical, physiochemical, . . . and the like) and other changes may be made without departing from the spirit or scope of the present invention. Accordingly, the following detailed description is not to be taken in a limiting sense, and the scope of aspects of embodiments and embodiments of the present invention are defined by the appended claims. It is also understood that terms such as "top," "bottom," "outward," "inward," and the like are words of convenience and are not to be construed as limiting terms.

Figure 1:
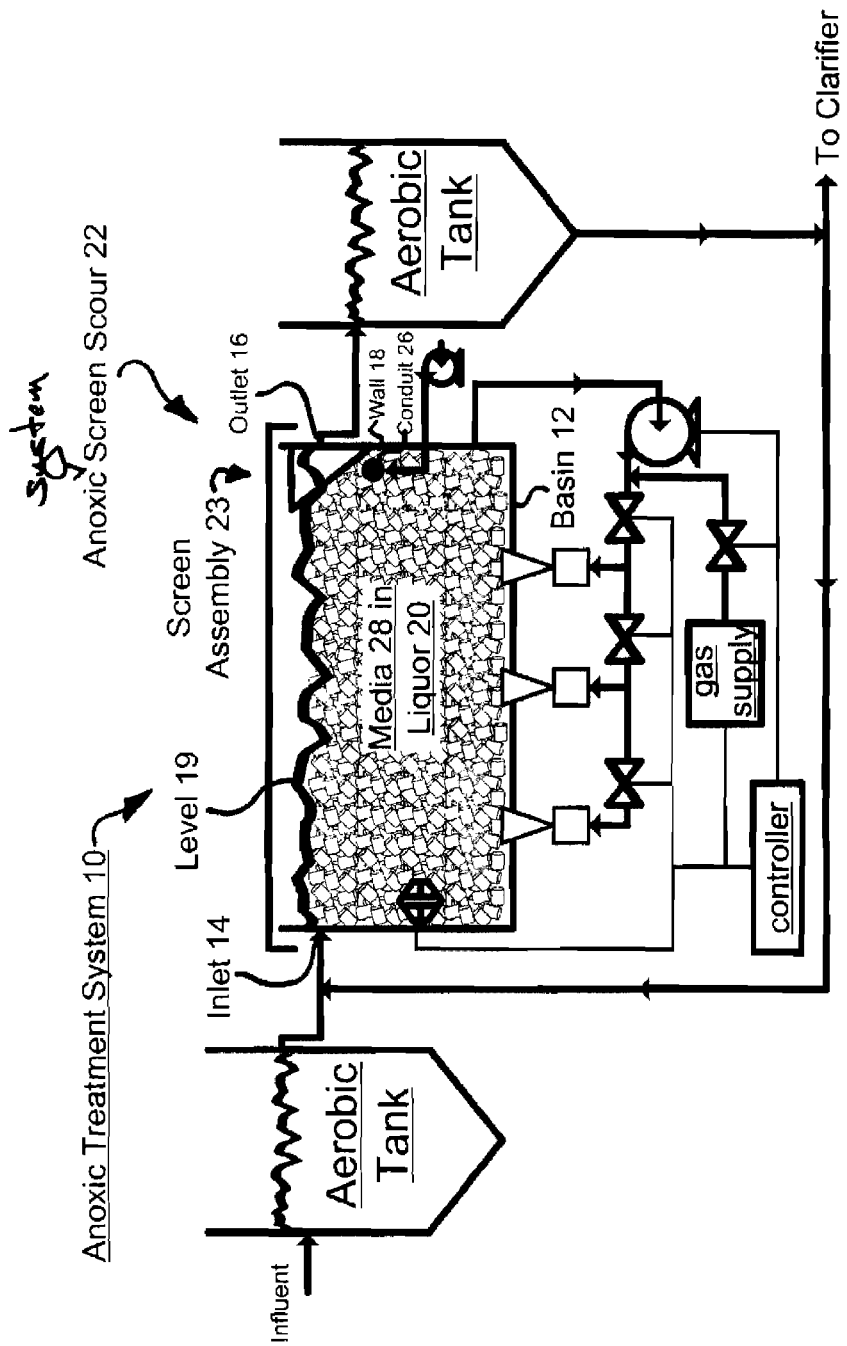
FIG. 1 is a schematic of a wastewater system (e.g., an anoxic treatment system) according to aspects of embodiments of the present invention.

FIG. 1 shows a wastewater system (e.g., an anoxic treatment system 10) having a basin 12 including an inlet 14 and an outlet 16 as well as optional elements. The basin 12 may contain a liquor 20 during treatment. The basin 12 may contain one or more means for providing one or more gases to one or more screens (e.g., an anoxic system screen scour(s) 22) that may include one or more screen assembly(ies) 23 and one or more oxygen-containing gas conduit(s) 26. The anoxic system screen scour 22 may be completely submerged below the liquor level 19 or partially submerged below the liquor level 19. The anoxic treatment system 10 may also contain one or more media 28 or types of media 28. The anoxic system screen scour 22 may be located adjacent to the wall 18 of the basin 12 at the outlet 16.

According to aspects of embodiments of the present invention, the anoxic system screen scour 22 may be configured in such a way so as to allow one or more oxic gases to be provided by the one or more oxygen-containing gas conduit(s) 26 to the screen assembly 23 in such a manner that the oxic gas will dislodge or discourage media 28 from adhering to the screen assembly screens 24, 30, 32, 34 and/or will dislodge or discourage biology growth on the screen assembly screens 24, 30, 32, 34, thereby preventing or discouraging the blinding of the screen(s) while at the same time substantially maintaining the anoxic character of the liquor 20.

Figure 2:
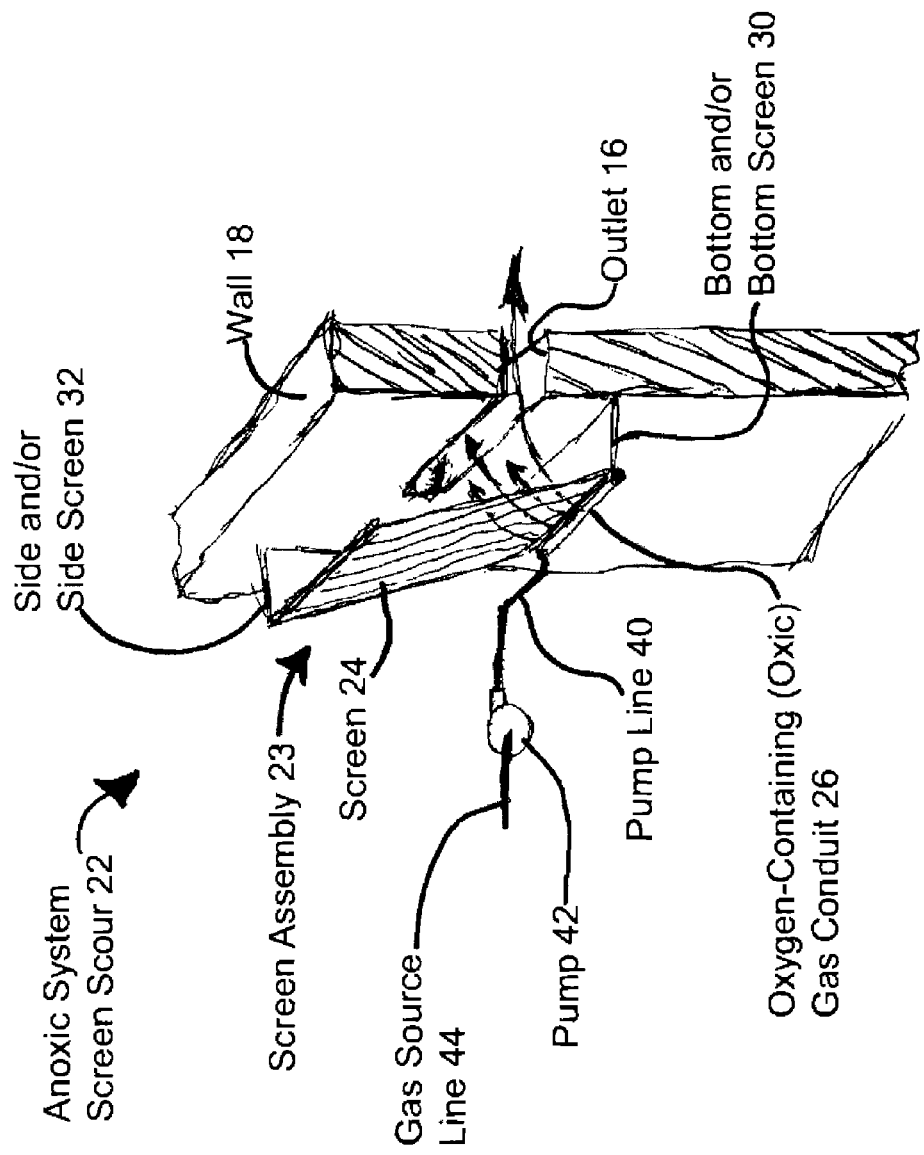
FIG. 2 is a perspective cut-away view of one or more means for providing one or more gases to one or more screens (e.g., an anoxic system screen scour) made in accordance with aspects of embodiments of the present invention.

An aspect of an embodiment of an anoxic system screen scour 22 is shown in FIG. 2. The anoxic system screen scour 22 may be located adjacent to the wall 18. The outlet 16 may be located in the wall 18 through which the effluent may flow. The anoxic system screen scour 22 may include screens 24, 32, 30, 34 so as to create a permeable barrier around outlet 16. The oxygen-containing gas conduit 26 may be located in relation to the screen assembly in such a way that the oxic gas may dislodge or discourage media 28 from adhering to the screen assembly screens 24, 30, 32, 34 and/or dislodge or discourage biology growth on the screen assembly screens 24, 30, 32, 34, thereby preventing or discouraging the blinding of the screen(s) while at the same time substantially maintaining the anoxic character of the liquor 20. For example, as shown in FIG. 2, a oxygen-containing gas conduit 26 may be located substantially near or at the bottom 30 of the screen assembly screen 24. The oxygen-containing gas conduit 26 may be in communication with a gas supply, not shown, via pump line 40, pump 42, gas source line 44, and/or other lines or systems, not shown, for moving the gas.

Figure 3A:
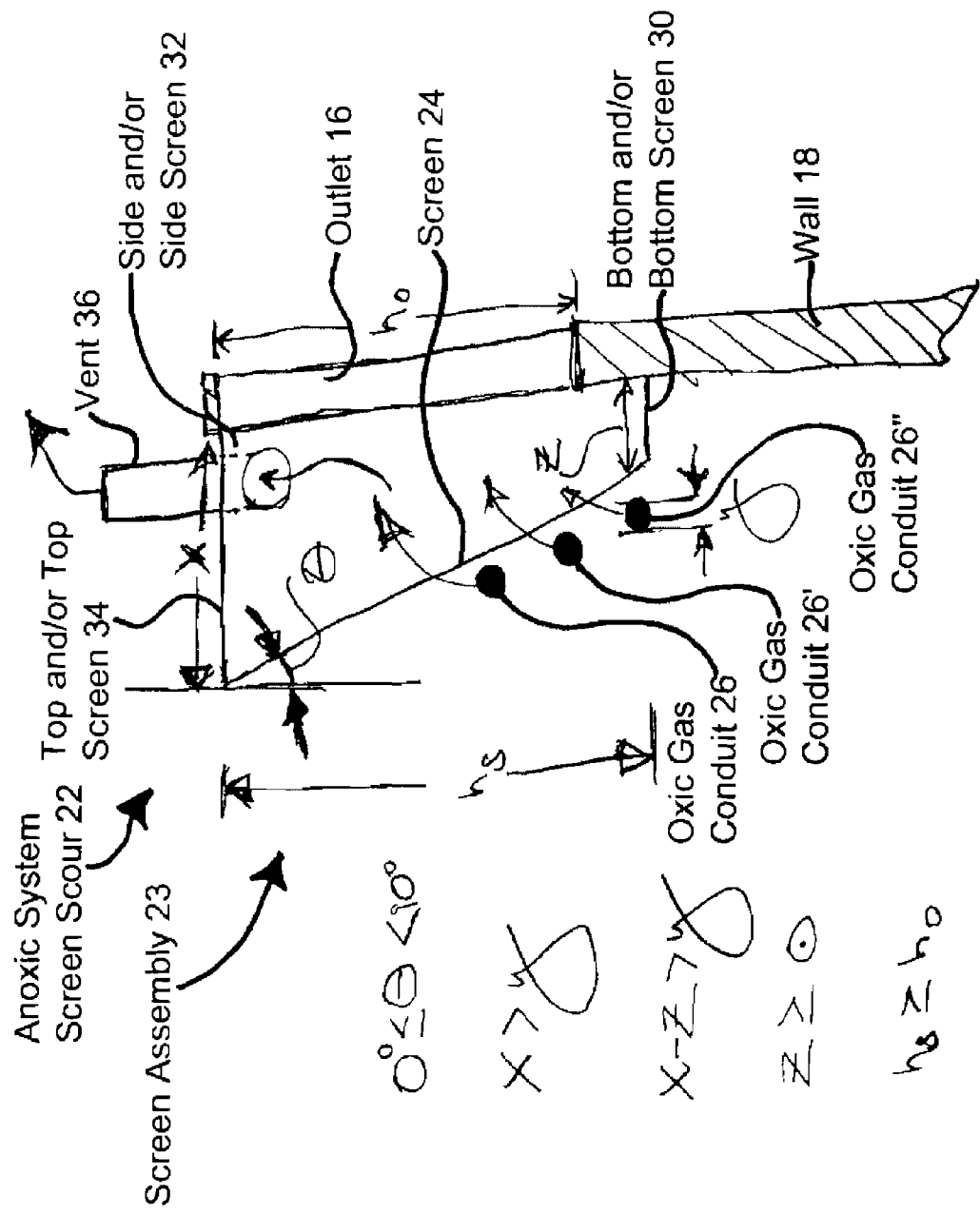
FIG. 3A is a cross section of one or more means for providing one or more gases to one or more screens (e.g., an anoxic system screen scour) made in accordance with aspects of embodiments of the present invention.

FIG. 3A shows other aspects of embodiments concerning the relationship of various dimensions of an anoxic system screen scour 22, such that the relationship of various dimensions facilitate the oxic gas dislodging or discouraging media 28 from adhering to the screen assembly screens 24, 30, 32, 34 and/or dislodging or discouraging biology growth on the screen assembly screens 24, 30, 32, 34, thereby preventing or discouraging the blinding of the screen(s) while at the same time substantially maintaining the anoxic character of the liquor 20.

Examples include, without limitation: the spacing of the oxygen-containing gas conduits 26, 26', 26" in relation to each other as well as the screen assembly 23; a vertical inclination angle $\Theta$ of screen assembly screen 24 may be equal to or greater than about 0° and less than about 90°; a height $h_s$ of the screen assembly 23 is greater than or substantially equal to a height $h_o$ of the outlet 16; a width y of the oxygen-containing gas conduit 26, 26', 26" may be less than a width x of the screen assembly screen 34 or less than the difference of width x of the screen assembly screen 34 and a width z of the screen assembly screen 30; a width z of the screen assembly screen 30 is greater than or substantially equal to 0; or combinations thereof. A anoxic system screen scour 22 may optionally include a vent 36 located on side 32 extending upwards so that the oxic gas does not substantially influence the anoxic character of the liquor 20.

Figure 3B:
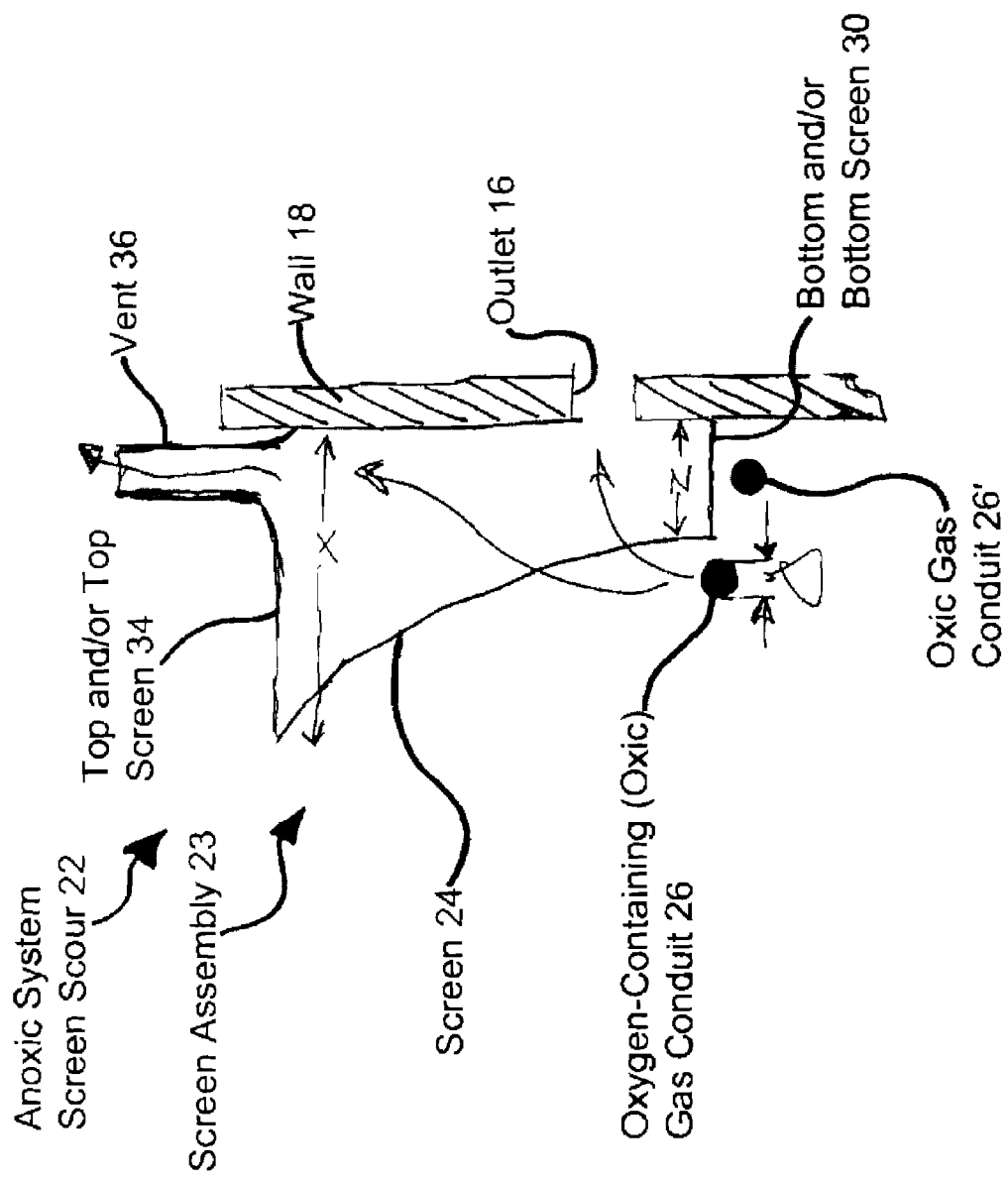
FIG. 3B is a cross section of one or more means for providing one or more gases to one or more screens (e.g., an anoxic system screen scour) made in accordance with aspects of embodiments of the present invention.

FIG. 3B shows other aspects of embodiments, such as, without limitation, screen assembly screen 24 being concave; vent 36 located on top 34 extending upwards so that the oxic gas does not substantially influence the anoxic character of the liquor 20; top 34 being configured to encourage the movement of the oxic gas through vent 36; outlet 16 being smaller than the screen assembly 23; additional or alternative oxygen-containing gas conduit 26' located below the screen assembly screen 30; or combinations thereof.

Figure 4:
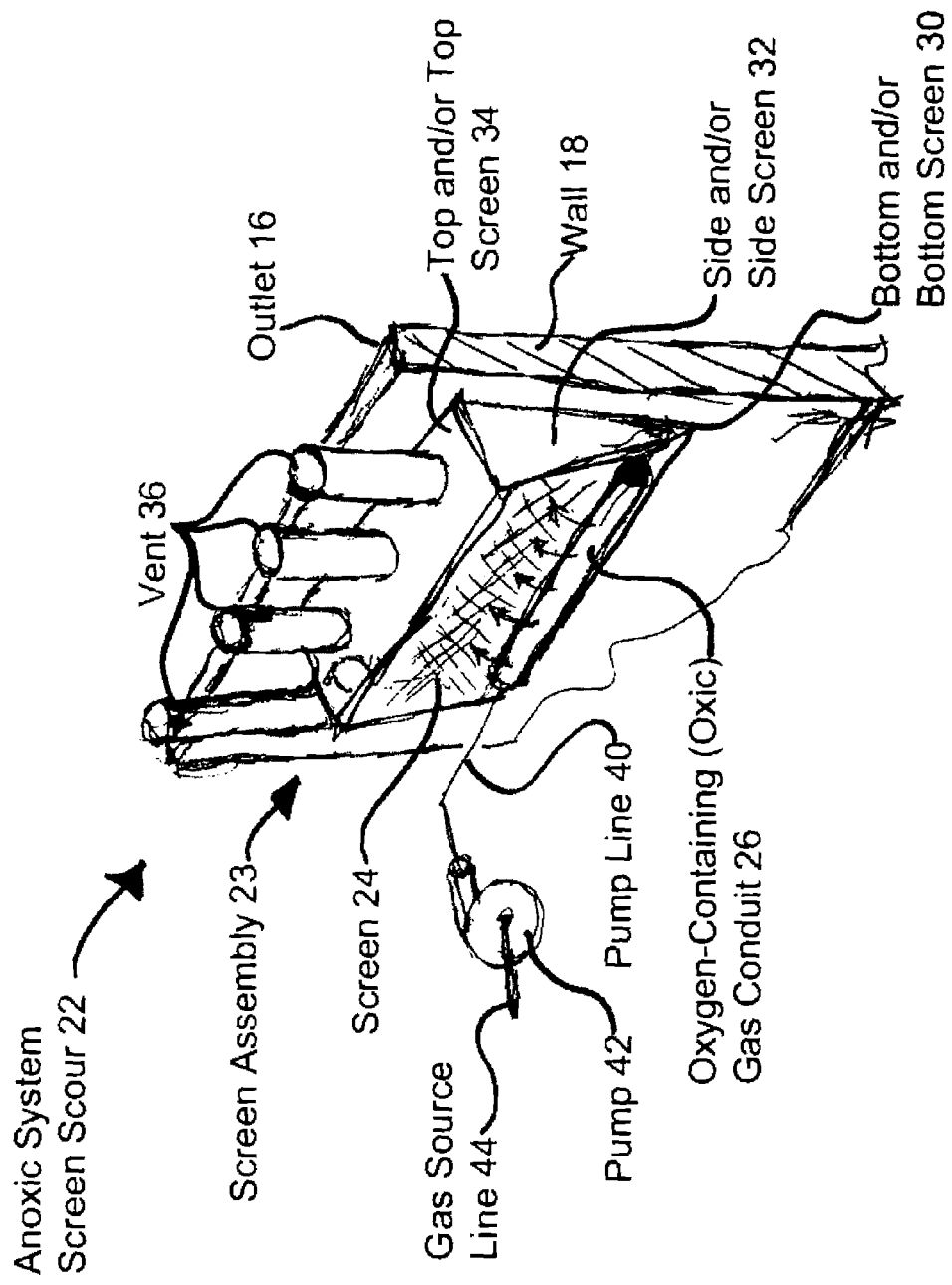
FIG. 4 is a perspective view of one or more means for providing one or more gases to one or more screens (e.g., an anoxic system screen scour) made in accordance with aspects of embodiments of the present invention.
Figures 5A, 5B, 5C:
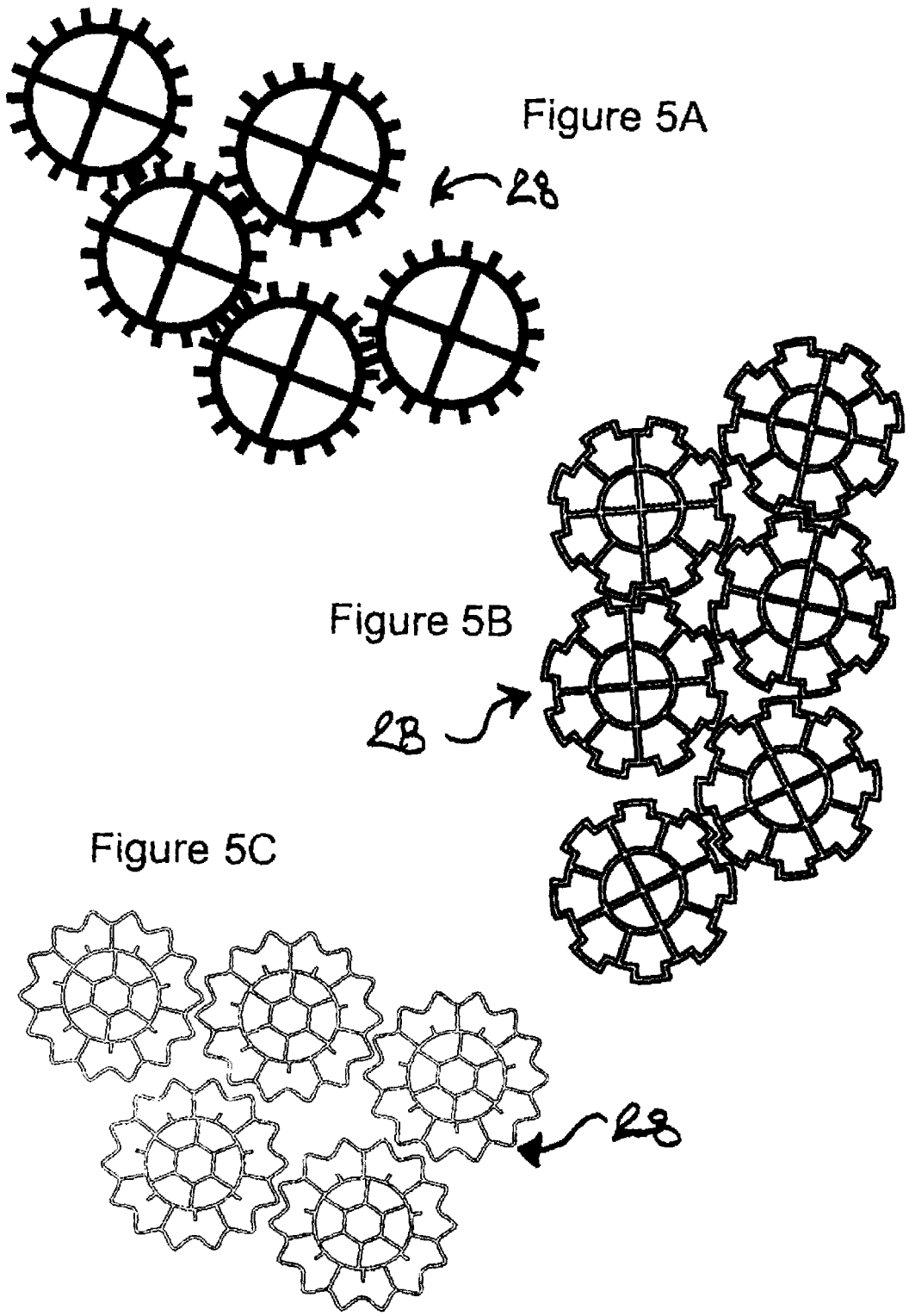
FIG. 5A is a cross-sectional or end view of a media according to aspects of embodiments of the present invention.
FIG. 5B is a cross-sectional or end view of a media according to aspects of embodiments of the present invention.
FIG. 5C is a cross-sectional or end view of a media according to aspects of embodiments of the present invention.

FIG. 4 shows other aspects of embodiments, such as, without limitation, a width z of bottom 30 being substantially 0; multiple vents 36 extending upwards from the side 32 and top 34 so that the oxic gas does not substantially influence the anoxic character of the liquor 20; or combinations thereof.

It will be appreciated that one or more oxygen-containing gas conduit(s) 26 may be located in relation to screen assembly 23 in any way or combination such that the oxic gas may be used to dislodge or discourage media 28 from adhering to the screen assembly screens 24, 30, 32, 34 and/or to dislodge or discourage biology growth on the screen assembly screens 24, 30, 32, 34, thereby preventing or discouraging the blinding of the screen(s) while at the same time substantially maintaining the anoxic character of the liquor 20.

In many wastewater treatment systems, such as anoxic treatment system 10, the goal is to remove all forms of nitrogen. In such systems, the influent nitrogen passing through inlet 14 is largely in the form of ammonia. In aspects of embodiments of such systems, this ammonia ($NH_3$) is reduced under aerobic conditions to $NO_2$ and $NO_3$ (collectively referred to as $NO_x$) in a process commonly called nitrification. According to aspects of embodiments of anoxic treatment system 10, the nitrogen is further reduced by converting $NO_x$ to $N_2$ in very low levels. This process is commonly called denitrification. Denitrification may be completed under anoxic conditions where there may be an absence of oxygen and biology which has been selected specifically to utilize the electron donor found in $NO_x$ may be present. Anoxic treatment system 10 may be subsequent to an aerobic stage, or may be prior to an oxic stage. In the anoxic treatment system 10, the nitrified mixed liquor 20 from an oxic zone may be recycled to the head of the anoxic treatment system 10.

As the metabolic reactions using oxygen are more efficient and because the biology capable of using $NO_x$ in the absence of oxygen prefers oxygen when it is present, even in small amounts, the denitrification process will be retarded and oxic metabolisms will occur when small amounts of oxygen are present.

In some aspects of embodiments, the addition of attached growth media 28 in the anoxic treatment system 10 is used to enhance the presence and effectiveness of the denitrification biology. In these aspects of embodiments, a screen assembly 23 is used to contain the media 28 within the anoxic basin 12. Even when media 28 is not used, screen assemblies 23 may be used to inhibit the passage of solids from the basin 12 with the effluent through outlet 16. One common problem with these screen assemblies 23 is that the media 28 may adhere to and biology may grow on the screen assembly screens 24, 30, 32, 34, thereby blinding the screen(s). Aspects of embodiments of the present invention may be used to dislodge or discourage media 28 from adhering to the screen assembly screens 24, 30, 32, 34 and to dislodge or discourage biology growth on the screen assembly screens 24, 30, 32, 34, thereby preventing or discouraging the blinding of the screen(s).

Applicant contemplates that in aspects of embodiments of the present invention, an anoxic treatment system 10 may be used in or be any one of a municipal wastewater treatment facility, an industrial wastewater treatment facility, a commercial wastewater treatment facility, a ship wastewater treatment facility, an agricultural wastewater treatment facility, or any combination of any of the preceding. Descriptions of wastewater treatment systems applicable to the current invention can be found in U.S. Publication No. 2007/0102354 and U.S. Pat. No. 7,445,715, both of which are hereby fully incorporated by reference.

In operation, an influent is provided through inlet 14 so that liquor 20 is contained within basin 12. An effluent leaving basin 12 of the anoxic treatment system 10 does so by outlet 16. The anoxic treatment system 10 may contain numerous media 28 and types of media 28 to support biological growth. In situations where there is a screen assembly 23 at outlet 16, the media 28 may adhere to and/or biology may grow on the screen assembly screens 24, 30, 32, 34, thereby blinding the screen(s). The anoxic system screen scour 22 may be able to use a gas which, if introduced into an anoxic environment, would slow or stop the denitrification process taking place in liquor 20, may be used to dislodge or discourage media 28 from adhering to the screen assembly screens 24, 30, 32, 34 and/or to dislodge or discourage biology growth on the screen assembly screens 24, 30, 32, 34, thereby preventing or discouraging the blinding of the screen(s) while at the same time substantially maintaining the anoxic character of the liquor 20. The oxygen-containing gas moves from the oxygen-containing gas conduit 26 upwards to make contact with the screen assembly 23. The oxygen-containing gas may exit basin 12 through the outlet 16 with the effluent, or optionally it may exit from the anoxic system screen scour 22 via the vent 36 extending upwards from the anoxic system screen scour 22.

In an anoxic treatment system 10 containing one or more media 28, the screen assembly screens 24, 30, 32, 34 are contemplated to be sized so as to facilitate retention of the number of media 28 within the anoxic treatment system 10 and, optionally, to prevent the passage of solids from the basin 12 through the outlet 16. The screen assembly screens 24, 30, 32, 34 may be sized with screen slots smaller than the smallest dimensions of the one or more media 28. In an anoxic treatment system 10 which does not contain media 28, the screen assembly screens 24, 30, 32, 34 may be sized with screen slots in any size which would facilitate the retention of any solids within the liquor 20.

The screens used in the screen assembly 23 may be configured to allow the passage of the oxic gas released from the oxygen-containing gas conduit 26 substantially pass through the screen assembly 23 into the interior of the anoxic system screen scour 22 with minimal gas passing into liquor 20 within basin 12. An example of a screen orientation which may allow the passage of the gas released from the oxygen-containing gas conduit 26 substantially pass through the screen assembly 23 into the interior of the anoxic system screen scour 22 with minimal gas passing into liquor 20 within basin 12 is an orientation such that the longest axis of the screen slot, the space between the material which makes up the screen, is in a substantially perpendicular orientation and the shortest axis is in a substantially parallel orientation in relation to the oxygen-containing gas conduit 26.

The Applicants contemplate that examples of such screens would include, without limitation, grating, expanded metal, hexagonal netting, perforated mesh, square mesh, wedge wire screen, welded wire mesh, wire mesh fence, woven, other screens known to one having ordinary skill in the art, or any combination thereof. Such screens may be made of any type of material adapted to withstand a wastewater treatment system, specifically an anoxic wastewater treatment system, without degrading and/or corroding substantially. Examples include metallic materials such as stainless steels, durimet alloys, titanium, titanium alloys, or other metals known to one skilled in the art; polymers including without limitation, polyvinyls such as polyvinyl chloride, polyolefins such as polyethylene and/or polypropylene, fluoropolymers such as polyvinylidene fluoride or polytetrafluoroethylene (PTFE), or other polymers known to one skilled in the art; any other material adapted to withstand a wastewater treatment system, specifically an anoxic wastewater treatment system, without degrading and/or corroding substantially known to one skilled in the art; a composite of at least two of the preceding; or any combination of any of the preceding.

Portions of screen assembly 23 could also be made of a solid material through which liquor 20 would not be able to pass. For example, it is contemplated that screen assembly bottom 30 may be a solid material disclosed above extending from screen assembly screen 24 and to wall 18 as shown in FIG. 2. Likewise, screen assembly side 32, screen assembly top 34, or any combination thereof may be a solid material disclosed above extending from screen assembly screen 24 to wall 18.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by an aspect of an embodiment and/or embodiments of the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

The functions of the various elements shown in the Figures would, in aspects of embodiments and/or embodiments be implemented by one or more screens (e.g., grating, expanded metal, hexagonal netting, perforated mesh, square mesh, wedge wire screen, welded wire mesh, wire mesh fence, woven, . . . etc.), conduits (e.g., pipes, tubing, manifolds, . . . etc.), interrelating elements (e.g., fasteners, hardware, braces, supports, connectors, suspenders, spacers, . . . etc.) or the like rather than individual elements. Thus, in the claims hereof any element or combinations of elements expressed as or including a means for performing a specified function or functions is intended to encompass any way of performing that function and combinations of any way of performing that function. Thus, it will be appreciated that Applicants regard any element or elements capable of performing particular functions recited in the claims as being equivalent to those disclosed herein.

While typical aspects of embodiment and/or embodiments have been set forth for the purpose of illustration, the foregoing description and the accompanying drawings should not be deemed to be a limitation on the scope of the invention. Accordingly, various modifications, adaptations, and alternatives may occur to one skilled in the art without departing from the spirit and scope of the present invention. It should be understood that all such modifications and improvements have been deleted herein for the sake of conciseness and readability but are properly within the scope of aspects of embodiments of the present invention. Numerous other aspects of embodiments, embodiments, features, and advantages of the present invention will appear from the description and the accompanying drawings. In the description and/or the accompanying drawings, reference is made to exemplary aspects of embodiments and/or embodiments of the invention, which can be applied individually or combined in any way with each other.

We claim:

1. A method of dislodging or discouraging media from and/or biology growth on one or more screens in a wastewater system while substantially maintaining the oxygen levels of the wastewater system in proximity to said one or more screens, said method comprising,
    at least partially contacting said one or more screens with one or more gases in such a way that said oxygen levels of said wastewater system in proximity to said one or more screens are substantially maintained at the same oxygen levels as when said one or more gases are not provided for at least partially contacting said one or more screens.

2. The method of claim 1, wherein at least one of said one or more gases are oxic.

3. The method of claim 2, wherein said wastewater system further comprises one or more means for facilitating the movement of said one or more gases out of said wastewater system while substantially maintaining said oxygen levels of said wastewater system in proximity to said one or more screens at the same oxygen levels as when said one or more gases are not provided for at least partially contacting said one or more screens.

4. The method of claim 3, wherein said one or more gases are provided using a gas conduit; and
    wherein said one or more means for facilitating the movement of said one or more gases comprises said one or more screens being configured in relation to said one or more gas conduits such that the longest axis of said one or more screens is in a substantially perpendicular orientation and the shortest axis of said one or more screens is in a substantially parallel orientation.

5. The method of claim 3, wherein said one or more means for facilitating the movement of said one or more gases comprises one or more vents wherein said one or more vents are configured so as to allow at least a portion of said one or more gases to exit said wastewater system in proximity to said one or more screens.

6. The method of claim 2, further comprising,
    configuring said one or more screens in such a way that said one or more gases pass through said screen.

7. The method of claim 2, further comprising,
    maintaining a denitrification process of said wastewater system in proximity to said one or more screens.

8. The method of claim 2, further comprising,
    not stopping a denitrification process of said wastewater system in proximity to said one or more screens.

9. The method of claim 1, wherein said wastewater system further comprises one or more means for facilitating the movement of said one or more gases out of said wastewater system while substantially maintaining said oxygen levels of said wastewater system in proximity to said one or more screens at the same oxygen levels as when said one or more gases are not provided for at least partially contacting said one or more screens.

10. The method of claim 9, wherein said one or more gases are provided using a gas conduit; and
    wherein said one or more means for facilitating the movement of said one or more gases comprises said one or more screens being configured in relation to said one or more gas conduits such that the longest axis of said one or more screens is in a substantially perpendicular orientation and the shortest axis of said one or more screens is in a substantially parallel orientation.

11. The method of claim 9, wherein said one or more means for facilitating the movement of said one or more gases comprises one or more vents wherein said one or more vents are configured so as to allow at least a portion of said one or more gases to exit said wastewater system in proximity to said one or more screens.

12. The method of claim 1, further comprising,
    configuring said one or more screens in such a way that said one or more gases pass through said screen.

13. The method of claim 1, further comprising,
    maintaining a denitrification process of said wastewater system in proximity to said one or more screens.

14. The method of claim 1, further comprising,
    not stopping a denitrification process of said wastewater system in proximity to said one or more screens.

15. A method of adapting a wastewater system comprising,
    providing,
        one or more screens;
        one or more means for providing one or more gases; and
        one or more means for interrelating said one or more screens and said one or more means for providing one or more gases such that said one or more gases will at least partially contact said one or more screens,
    wherein said proving adapts the wastewater system to be configured to be capable of dislodging or discouraging media from and/or biology growth on one or more screens while substantially maintaining the oxygen levels of said wastewater system in proximity to said one or more screens at the same oxygen levels as prior to said providing; and
    at least partially contacting said one or more screens with one or more gases in such a way that said oxygen levels of said wastewater system in proximity to said one or more screens are substantially maintained at the same oxygen levels as when said one or more gases are not provided for at least partially contacting said one or more screens.

16. The method of claim 15, wherein said providing of said one or more means for providing one or more gases comprises providing one or more gas conduits.

17. The method of claim 15, further comprising providing one or more means for facilitating the movement of said one or more gases out of said wastewater system while substantially maintaining said oxygen levels of said wastewater system in proximity to said one or more screens at the same oxygen levels as when said one or more gases are not provided for at least partially contacting said one or more screens.

18. The method of claim 17, wherein said providing of said one or more means for facilitating the movement of said one or more gases out of said wastewater system comprises providing said one or more screens in a configured relation to said one or more means for providing one or more gases comprising one or more gas conduits such that a longest axis of said one or more screens is in a substantially perpendicular orientation and a shortest axis of said one or more screens is in a substantially parallel orientation.

19. The method of claim 15, wherein said providing of said one or more screens comprises providing one or more arcuate screens.

20. The method of claim 17, wherein said providing of said one or more means for facilitating the movement of said one or more gases out of said wastewater system comprises providing one or more vents wherein said one or more vents are configured so as to allow at least a portion of said one or more gases to exit said wastewater system in proximity to said one or more screens.

21. The method of claim 15, wherein said providing of said one or more screens and said one or more means for providing one or more gases comprises configuring said one or more screens and said one or more means for providing one or more gases in such a way that at least a portion of said one or more gases pass through said one or more screens.

22. A method of dislodging or discouraging media from and/or biology growth on one or more screens in a wastewater system while substantially maintaining the oxygen levels of the wastewater system in proximity to said one or more screens, said method comprising,
configuring a wastewater system by providing one or more screens and one or more means for providing one or more gases in a configured relationship so as to allow a dislodging or discouraging media from and/or biology growth on one or more screens while substantially maintaining the oxygen levels of the wastewater system in proximity to said one or more screens; and
at least partially contacting said one or more screens with one or more gases in such a way that said oxygen levels of said wastewater system in proximity to said one or more screens are substantially maintained at the same oxygen levels as when said one or more gases are not provided for at least partially contacting said one or more screens.

23. The method of claim 22, wherein at least one of said one or more gases are oxic.

24. The method of claim 22, wherein said providing of said one or more means for providing one or more gases comprises providing one or more gas conduits.

25. The method of claim 22, further comprising providing one or more means for facilitating the movement of said one or more gases out of said wastewater system while substantially maintaining said oxygen levels of said wastewater system in proximity to said one or more screens at the same oxygen levels as when said one or more gases are not provided for at least partially contacting said one or more screens.

26. The method claim 25, wherein said providing of said one or more means for facilitating the movement of said one or more gases out of said wastewater system comprises providing one or more gas conduits.

27. The method of claim 26, wherein said providing of said one or more screens comprises providing said one or more screens in a configured relation to said one or more gas conduits such that a longest axis of said one or more screens is in a substantially perpendicular orientation and a shortest axis of said one or more screens is in a substantially parallel orientation.

28. The method of claim 25, wherein said providing of said one or more means for facilitating the movement of said one or more gases out of said wastewater system comprises providing one or more vents wherein said one or more vents are configured so as to allow at least a portion of said one or more gases to exit said wastewater system in proximity to said one or more screens.

29. The method of claim 22, wherein said providing of said one or more screens comprises providing of one or more arcuate.

30. The method of claim 22, wherein said providing of said one or more screens and said one or more means for providing one or more gases comprises configuring said one or more screens and said one or more means for providing one or more gases are configured in such a way that at least a portion of said one or more gases pass through said one or more screens.

31. The method of claim 22, wherein said wastewater system is configured to maintain a denitrification process of said wastewater system in proximity to said one or more screens.

32. The method of claim 22, wherein said wastewater system is configured not to stop a denitrification process of said wastewater system in proximity to said one or more screens.

* * * * *